United States Patent [19]
de Jong

[11] Patent Number: 4,929,475
[45] Date of Patent: May 29, 1990

[54] NOVEL STOVING LACQUERS AND THEIR USE

[75] Inventor: Hendrikus de Jong, Maasdam, Netherlands

[73] Assignee: Hunter Douglas International N.V., Curacao, Netherlands

[21] Appl. No.: 399,363

[22] Filed: Aug. 28, 1989

Related U.S. Application Data

[63] Continuation of Ser. No. 169,717, Mar. 18, 1988, abandoned.

[30] Foreign Application Priority Data

Mar. 18, 1987 [GB] United Kingdom ................ 8706362

[51] Int. Cl.$^5$ .............................................. B05D 3/02
[52] U.S. Cl. .................................. 427/407.1; 427/375; 427/409; 427/410; 427/428
[58] Field of Search ...................... 525/423, 424, 428; 427/388.1, 407.1, 409, 410, 428, 375

[56] References Cited

U.S. PATENT DOCUMENTS 4,617,339 10/1986 Rocholl et al. ..................... 524/514

Primary Examiner—Theodore E. Pertilla
Attorney, Agent, or Firm—Pennie & Edmonds

[57] ABSTRACT

Stoving lacquers which are essentially useful in "coil coating" and provide a finish simulating that of a metallic lacquer comprise a stovable colored film-forming binder composition having colorless transparent particles dispersed therein.

8 Claims, 1 Drawing Sheet

019;4,929,475

NOVEL STOVING LACQUERS AND THEIR USE

This is a continuation of application Ser. No. 169,717, filed Mar. 18, 1988, now abandoned.

BACKGROUND OF THE INVENTION

This invention relates to stoving lacquers especially useful in so called "coil coating".

So called "metallic lacquers" provide a characteristic finish which is widely used for coating mainly metallic articles such as, for example, claddings for buildings, slatted blinds, and motor vehicle panels. The characteristic optical effect is caused by variations in light reflection and intensity which vary with the angle of observation and over the lacquer surface. In the known metallic lacquers the visual effect is produced by the presence of metallic pigments in the form of minute metallic flakes embedded in a clear and usually colored binder. In place of the metallic flakes it is also possible to use mica flakes provided with a titanium dioxide deposit.

Such metallic lacquers are expensive and not always very stable, either to light or in their resistance to acid and alkalis. Moreover, they are liable to go cloudy on application and may need to be provided with additional protective layers.

The present invention provides a novel stoving lacquer which, when applied to a reflective surface and stoved, gives an optical effect similar to that of a metallic lacquer, while avoiding at least some of the disadvantages of the latter.

SUMMARY OF THE INVENTION

A stoving lacquer in accordance with the present invention comprises a stovable transparent film-forming binder composition which has dispersed therein transparent particles having a particle size in the range of 2 to 50 micrometers, one of the said binder and the said particles being substantially colorless and the other being colored, the said binder composition and the said particles being such that when the said lacquer has been stoved, the particles remain as a separate phase and do not substantially protrude from the surface of the stoved lacquer layer and the stoved layer contains substantially colorless transparent zones through the thickness of the said layer and colorless transparent zones extending partly through the said layer and the said layer has an uneven color intensity. When such a stoving lacquer is applied to the reflective surface of a stoving heat resistant substrate and stoved, minute "windows" are formed in the stoved lacquer layer, through which the reflective surface to which the lacquer has been applied may be seen. It is not necessary that such windows shall necessarily extend completely through the thickness of the layer provided that the "window" is sufficiently transparent to permit substantial reflection of light from the reflective surface of the substrate. The "windows" are randomly distributed throughout the stoved lacquer layer and are more or less irregular in outline so that the reflectiveness of the stoved layer is strongly dependent upon the position and angle of view.

The invention thus includes within its scope a process for producing an article having a metallic appearance which comprises applying to the reflective surface of a stoving heat resistant article having a reflective surface, a stoving lacquer composition of the invention and stoving the said lacquer composition whereby a stoved lacquer is formed on the surface of said article.

Apart from the binder selection that is selected to meet the essential requirement that the particles remain as a separate phase in respect of the binder after stoving, the material, size and volume of the particles as well as the stoving conditions and, therewith, the extent of particle-flow and particle-agglomeration is chosen and balanced to achieve the required optical effect. In this respect the extent of both of either the flow and the agglomeration can be chosen to be zero.

DETAILED DESCRIPTION OF THE PREFERRED EMBODIMENT

Figure 1:
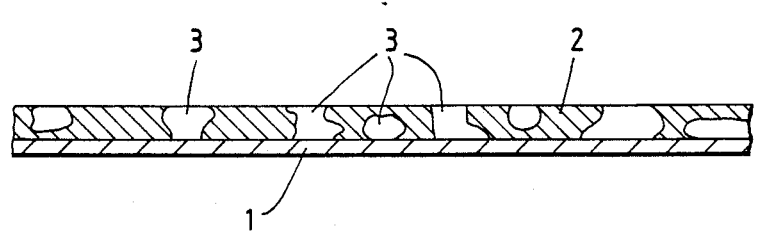
FIG. 1 is a cross-sectional diagrammatic representation of a stoved layer produced from the present stoving lacquer.
Figure 2:
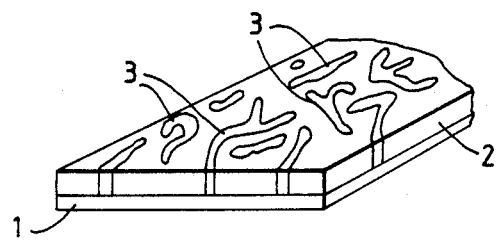
FIG. 2 is a perspective view of an alternative type of stoved layer produced from the present stoving lacquer.

In the accompanying drawings FIG. 1 shows, in cross-section, a diagrammatic representation of a stoved layer produced from a stoving lacquer in accordance with the present invention. The reflective substrate 1 carries the stoved binder layer 2 in which are minute "windows" formed of the transparent particles. 3. FIG. 2 shows an alternative type of layer in which the substrate 1 carries the stoved binder layer 2 in which the transparent particles 3 have fused to form a network of fused particles or a multitude of irregularly shaped separate strips.

The film-forming binder composition used in the novel stoving lacquers may be of known kind provided that it is transparent and preferably colored. A suitable film-forming binder composition may be based on polyurethanes, polyesters or polyacrylates which can be cured by heating. While the binder composition is preferably thermo-setting, i.e., is cured during the stoving operation, it is also possible to use stovable binder compositions based on thermoplastic resins which have adequate durability and hardness for the envisaged end use. Suitable compositions may be based on cross-linkable polyesters, which may be combined with thermosettable aminoplast resins based on, for example, benzoguanamine or melamine. Other suitable compositions may be based on cross-linkable blocked polyurethane resins which may be combined with thermoplastic resins, such as, cellulose acetate butyrate. Thermoplastic stovable compositions may be based on, for example, polyvinyl chloride or another vinyl copolymer, which may be hardened by the inclusion of a thermosetting resin, such as, an epoxy resin or a melamine-based resin.

The binder composition, may, if desired, include a plasticizer to ensure adequate flexibility of the stoved layer and/or a flow additive to facilitate formation of a coating of even thickness. The usual stabilizers, against ultra-violet light, may be included.

Stovable film-forming binder compositions normally contain a solvent which is evaporated during the stoving operation. The solids content is usually 40 to 80% by weight, expressed as the weight percentage of total solids (not including the transparent particles mentioned above) based on the total weight of the binder composition.

The metallic effect produced by the stoving lacquers of the present invention depends in part on providing a color contrast between the transparent film forming binder and the transparent particles. This is normally achieved by using colorless transparent particles and including transparent pigments in the binder composition. Such pigments are known in the art and include, for example, yellow, red and black forms of iron oxide pigment and lamp black. Other transparent pigments including organic pigments may be used; the choice depending upon the desired color and the required degree of durability, especially light fastness.

The transparent particles included in the stoving lacquers of the invention must not dissolve in or react with the film forming binder composition. Thermoplastic particles are normally preferred. They may be made from, for example, polyvinylidenedifluoride, polyvinylfluoride, polytetrafluoroethylene, a polyamide, especially nylon 10, nylon 11 or nylon 12, or polypropylene. The transparent particles may have a particle size of 2 to 50 micrometers, preferably 10 to 20 micrometers. They are preferably included in the novel stoving lacquers in a proportion of 3 to 30% by weight based on the film-forming binder composition (total wet lacquer) or 5-70% by weight based on the stoved layer produced from the lacquer. The preferred proportions, in the case of particles less than 10 micormeters in size, are 5-10 by weight based on the wet stoving lacquer and 10 to 20% by weight based on the stoved layer produced therefrom. In the case of transparent particles having a particle size greater than 10 micrometers, the preferred proportions are 10 to 25% by weight based on the wet stoving lacquer and 20 to 50% by weight based on the stoved layer obtained therefrom.

Particularly attractive visual effects are obtained using colorless transparent polyamide particles having a particle size of about 5 micrometers, which are present in the stoving lacquers in a proportion of 5 to 10% by weight of the total wet lacquer.

The layer formed from the stoving lacquer in accordance with the present invention may have the usual thickness for a layer obtained from a stoving-lacquer, e.g. 2 to 50 micrometers, preferably 4 to 40 micrometers. The maximum size (diameter) of the transparent particles may be slightly greater (up to 20% greater) than the expected thickness of the stoved lacquer layer in those cases where the particles flow appreciably during the stoving operation. In this situation, the flow of the particles during the stoving ensures that there is no substantial protrusion of the particles above the surface of the stoved layer and a smooth surface is obtained which is essential for a satisfactory optical appearance of the stoved layer. If the transparent particles flow at the stoving temperature, they may have a diameter substantially smaller than the expected thickness of the stoved layer. In some embodiments of the invention, the materials and stoving conditions are chosen so that the particles normally agglomerate and form larger particles. With some combinations of particles and binder, a network of fused particles or a multitude of irregularly shaped separate strips, which are an initial stage in the network forming process, can be formed, and this produces an excellent optical effect. This type of layer is shown diagrammatically in the accompanying FIG. 2.

In some cases, for example with a large volume of very fine particles, a continuous layer of molten particles may be deliberately or accidentally formed, either directly between the substrate and the binder or over the binder. Such layer, if sufficiently thin and transparent and of appropriate color intensity, can still give acceptable results if special effects are required, but it reduces reflection intensity. Too high a proportion of the particles will always prevent the desired optical effects being obtained.

If the transparent particles do not substantially flow during the stoving operation, the particles should have a size which is the same as, or only slightly less than, the thickness of the stoved lacquer layer. In such a case it is also desirable to ensure that the shape of the individual particles is such as to facilitate the formation of the desired windows. More particularly highly irregular shapes should be avoided.

The new stoving lacquers are especially suitable for application to reflective and particularly metallic surfaces, e.g. of aluminum. The binder composition is formulated to have satisfactory adhesion to the substrate. In place of metallic surfaces, it is also possible to use other reflective surfaces including, especially, surfaces of transparent plastics materials which have been metalised on the reverse side.

The stoving operation may be carried out at temperatures up to 300° C., e.g 100° to 300° C. for times from, e.g., 15 seconds to 30 minutes, depending on the temperature used.

In the following Examples, the lacquer is a stoving lacquer for use in so called "coil" coating. In this process, a layer of lacquer is applied by means of a coating roller to one or both sides of an aluminum strip which is supplied from a roll, after which the strip is passed continuously through a muffle furnace, where the strip is heated to a temperature (measured as the temperature of the metal) of which the maximum value is given in each Example. The residence time in the furnace is about 30 seconds. During the heating, the solvent present in the binder composition evaporates after which the strip is cooled and wound up again as a roll. During the rolling up, the lacquer layer is already dry and cured. If desired more than one lacquering station may be used, e.g. to apply a special primer or special finish to the strip.

EXAMPLE I

EXAMPLE I
BRASS - COLORED LACQUER

| Component Type | Component Material | Weight Percentage based on wet lacquer |
|---|---|---|
| Transparent Resin | polyester L818 (60% in S150) | 62.0 |
| | benzoguanamine resin | 15.0 |
| | hexamethoxymelamine | 4.6 |
| Solvent | diacetone-alcohol | 20.0 |
| | Solvesso 100 | 15.0 |
| Catalyst | paratoluene-sulphonic-acid | 0.5 |
| Transparent Pigment | yellow iron oxide (micronised) | 1.8 |
| Transparent Particles | polyamide-12 (max. particle diameter 10 um) | 14.0 |

This lacquer is suitable for stoving at 225° C. for 60 seconds.

The base material can be aluminum, e.g. alustrip, or other material with a normal, glossy or highly reflective surface. Alternative materials are laminated materials having a metal or metallized surface layer. The same effect can be obtained if the surface to be coated has a metallic appearance and the surface does not have to consist of metal.

EXAMPLE II

**EXAMPLE II
COPPER - COLORED LACQUER**

| Component Type | Component Material | Weight Percentage based on wet lacquer |
| --- | --- | --- |
| Transparent Resin | blocked polyurethane (polyol + blocked isocyanate) (UB 1256, Huls) | 85.0 |
| | cellulose acetobutyrate | 5.0 |
| | flow additive | 0.5 |
| Solvent | Solvesso 150 | 15.0 |
| | diacetone-alcohol | 10.0 |
| Catalyst | dibutyl-tin-laurate (DBTL) | 0.3 |
| Transparent Pigment | red iron oxide ⎫ | 2.0 |
| | yellow iron oxide ⎬ micronised | 0.7 |
| | lamp black ⎭ | 0.5 |
| Transparent Particles | polyamide - 12 max. particle size 10 um | 8.0 |

This lacquer is suitable for stoving at 240° C. for 60 seconds.

The base material can be aluminum, e.g. alustrip, or other material with a normal, glossy or highly reflective surface. Alternative materials are laminated materials having a metal or metallized surface layer. The same effect can be obtained if the surface to and the surface does not have to consist of metal.

EXAMPLE III

**EXAMPLE III
BRONZE - COLORED LACQUER**

| Component Type | Component Material | Weight Percentage based on wet lacquer |
| --- | --- | --- |
| Transparent Resin | (a) vinylchloride/vinylpropionate copolymer (Lutofan 210, BASF) 50% in ethylacetate | 50.0 |
| | (b) epoxy resin (Epikote 828, Shell) | 15.0 |
| | (c) 55% melamine resin (Luwilpal 030, BASF) | 2.0 |
| Plasticizer | ethylhexylphthalate (Palatinol AH, BASF) | 2.8 |
| Solvent | Solvesso 100 | 15.0 |
| | Butyl-acetate | 24.0 |
| | ethyleneglycol-diacetate | 10.0 |
| Transparent Pigment | yellow iron oxide | 0.8 |
| | black iron oxide | 0.4 |
| Clear Particles | polyamide 12, max. particle size 20 um | 20.0 |

This lacquer is suitable for stoving at 245° C. for 60 seconds.

The base material can be aluminum e.g. alustrip, or other material with a normal, glossy or highly reflective surface. Alternative materials are laminated materials having a metal or metallized surface layer. The same effect can be obtained if the surface to be coated has a metallic appearance and the surface does not have to consist of metal.

I claim:

1. A process for producing a stoved lacquer layer having a metallic-lacquer appearance which comprises:
    selecting a stoving lacquer composition comprising a stovable transparent film-forming binder composition having dispersed therein transparent thermoplastic particles, wherein one of said binder composition or said particles is substantially colorless and the other is colored by transparent pigments, said particles being selected to be insoluble in the binder composition, to have a melting point which allows the particles after stoving to appear in the stoved lacquer in one of an independent, agglomerated or interfused but otherwise non-melted state, to have a general particle size within a range of 2 to 50 micrometers, and to have a volume ratio of binder/particles and a particle size within the said range so that, after stoving, the particles do not substantially protrude from the surface of the stoved lacquer layer and a predetermined "metallic effect" can be obtained;
    applying said stoving lacquer composition to a reflective surface of a stoving-heat-resistant material having one or more reflective surfaces; and
    forming substantially colorless transparent zones through the thickness of the stoved lacquer layer, and forming colorless transparent zones extending only partly through the said layer, which zones appear as randomly distributed minute "windows" in the lacquer layer, by stoving the lacquer under controlled conditions with respect to curing temperature and curing time thereby effectuating a specific predetermined particle-flow and particle-agglomeration to produce a stove lacquer layer having a predetermined optical "metallic lacquer" effect wherein the particles do not substantially protrude from the surface of the stoved lacquer layer.
2. The process of claim 1 wherein the transparent particles are selected to have a softening temperature such that they flow at the stoving temperature of the binder composition so that a considerable percentage of the flowing particles fuse to form one of particle agglomerates, irregular shaped separate strips or a network.
3. The process of claim 1 in which the stoving is effected at 100° to 300° C. for a period of between 15 seconds and 30 minutes.
4. The process of claim 1 in which the lacquer layer is applied in a coil coating process.
5. The process of claim 1 in which the proportion of the transparent particles is 3 to 30% by weight of the binder composition.
6. The process of claim 1 wherein the majority of the particles have a size of less than 10 micrometers and the proportion of the transparent particles is 5 to 10% by weight of the binder composition.
7. The process of claim 1 wherein the majority of the particles have a size greater than 10 micrometers and the proportion of the transparent particles is 10 to 25% by weight of the binder composition.
8. The process of claim 1 wherein the particles are colorless and the binder contains pigments.

* * * * *

UNITED STATES PATENT AND TRADEMARK OFFICE
CERTIFICATE OF CORRECTION

PATENT NO. : 4,929,475

DATED : May 29, 1990

INVENTOR(S) : Hendrikus de Jong

It is certified that error appears in the above-identified patent and that said Letters Patent is hereby corrected as shown below:

On title page;

Change the Assignee's address from "Curacao, Netherlands" to --Curacao, Netherlands Antilles--.

Signed and Sealed this

Thirteenth Day of August, 1991

*Attest:*

HARRY F. MANBECK, JR.

*Attesting Officer*    *Commissioner of Patents and Trademarks*